US008929645B2

(12) United States Patent
Coffman

(10) Patent No.: US 8,929,645 B2
(45) Date of Patent: Jan. 6, 2015

(54) METHOD AND SYSTEM FOR FAST DENSE STEREOSCOPIC RANGING

(71) Applicant: 21 CT, Inc., Austin, TX (US)

(72) Inventor: Thayne R. Coffman, Austin, TX (US)

(73) Assignee: 21 CT, Inc., Austin, TX (US)

( * ) Notice: Subject to any disclaimer, the term of this patent is extended or adjusted under 35 U.S.C. 154(b) by 155 days.

(21) Appl. No.: 13/739,208

(22) Filed: Jan. 11, 2013

(65) Prior Publication Data

US 2014/0198976 A1 Jul. 17, 2014

Related U.S. Application Data

(62) Division of application No. 12/451,064, filed as application No. PCT/US2008/005271 on Apr. 24, 2008, now Pat. No. 8,467,628.

(60) Provisional application No. 60/907,955, filed on Apr. 24, 2007.

(51) Int. Cl.
*G06K 9/00* (2006.01)
(52) U.S. Cl.
CPC .................................. *G06K 9/00201* (2013.01)
USPC ........................................................ 382/154
(58) Field of Classification Search
None
See application file for complete search history.

(56) References Cited

U.S. PATENT DOCUMENTS

| 6,757,445 B1 | 6/2004 | Knopp |
| 6,862,364 B1 | 3/2005 | Berestov |
| 6,911,995 B2 | 6/2005 | Ivanov et al. |
| 7,035,892 B2 | 4/2006 | Denk et al. |
| 7,199,793 B2 * | 4/2007 | Oh et al. ........................ 345/419 |
| 7,317,812 B1 | 1/2008 | Krahnstoever et al. |
| 7,522,186 B2 | 4/2009 | Arpa et al. |
| 7,860,301 B2 | 12/2010 | Se et al. |
| 2001/0025292 A1 | 9/2001 | Denk et al. |
| 2004/0104935 A1 | 6/2004 | Williamson et al. |

OTHER PUBLICATIONS

International Search Report from PCT/US08/05271 (WO 2009/023044), dated Jan. 21, 2009, 1 page.
IEEE Xplore search results by Examiner in U.S. Appl. No. 12/451,064, dated May 24, 2012, 5 pages.

* cited by examiner

*Primary Examiner* — Daniel Mariam
(74) *Attorney, Agent, or Firm* — Andrews Kurth LLP; Sean S. Wooden; Matthew J. Esserman

(57) ABSTRACT

A stochastic method and system for fast stereoscopic ranging includes selecting a pair of images for stereo processing, in which the pair of images are a frame pair and one of the image is a reference frame, seeding estimated values for a range metric at each pixel of the reference frame, initializing one or more search stage constraints, stochastically computing local influence for each valid pixel in the reference frame, aggregating local influences for each valid pixel in the reference frame, refining the estimated values for the range metric at each valid pixel in the reference frame based on the aggregated local influence, and post-processing range metric data. A valid pixel is a pixel in the reference frame that has a corresponding pixel in the other frame of the frame pair. The method repeats n iterations of the stochastically computing through the post-processing.

6 Claims, 9 Drawing Sheets

METHOD AND SYSTEM FOR FAST DENSE STEREOSCOPIC RANGING

GOVERNMENT LICENSE RIGHTS

This invention was made with Government support under Contract Nos. FA8651-04-C0233 and FA8651-05-C-0117 awarded by the United States Air Force Research Laboratory. The Government has certain rights in the invention.

RELATED APPLICATIONS

The present application is a divisional application of U.S. patent application Ser. No. 12/451,064, filed Oct. 23, 2009, which claims the priority of Patent Cooperation Treaty Patent Application No. PCT/US2008/005271, filed Apr. 24, 2008, which claims the priority of U.S. Provisional Application Ser. No. 60/907,955, filed Apr. 24, 2007, all of which are hereby incorporated herein by reference in their entirety.

BACKGROUND

Since the early 1970's, estimating the three-dimensional (3D) structure of a scene from two-dimensional (2D) imagery has been one of the most actively researched areas in the fields of digital image processing and computer vision. Thirty years of active research indicates the difficulty of developing efficient computational stereo techniques that are able to reconstruct dense scene structure estimates from stereo or monocular imagery.

The first step in bounding the problem is to define which sensors are considered imaging or visual sensors that generate the "visual images" for input. Typically sensors are categorized as active or passive. Active sensors include radar, synthetic aperture radar, ladar, sonar, and sonograms, which recover 3D information directly by sending out energy and analyzing the timing and/or content of reflections or returns. Also considered active are structured light sensors, which actively transmit a known lighting pattern to illuminate the target scene and then analyze images of the augmented scene. Active sensors generate depth estimates directly and thus do not need to estimate depth. Active sensors stand in contrast with passive staring visual sensors that analyze incoming energy that they did not generate. The common visible-light camera and video camera are passive visual sensors, as are electro-optic (EO) sensors that operate on other wavelengths like infrared, ultraviolet, multispectral, or hyperspectral.

Even within the more constrained realm of passive visual sensors, a wide variety of sensor configurations have been explored. Some approaches use a single camera or viewpoint (monocular), while others use two or more synchronized cameras capturing images from different viewpoints (binocular). Some approaches use video sequences (again, monocular, binocular, or even trinocular) with incremental changes in camera position between frames, and others operate on sets of a few images captured from widely varying viewpoints.

A number of different approaches can be followed to extract information on 3D structure from one or more images of a scene. "Shape from focus" techniques estimate depth by varying a camera's focal length or other intrinsic parameters, and identifying which parts of the image are sharply in focus at which set of parameters. "Shape from shading" techniques analyze changes in image intensity over space in a single image to infer the gradient of is the surface being imaged. "Semantic information" can also be used—if the real-world size and geometry of an Abrams M-1 tank is known and an Abrams M-1 tank is recognized in an image, the known size and appearance of its projection can be used to infer its distance and pose relative to the camera. Finally, direct per-pixel depth estimates can be extracted by using "structure from stereo" and "structure from motion" techniques, collectively known as computational stereo techniques. "Structure from stereo" refers to approaches based on two or more cameras, and "structure from motion" refers to approaches that use a single camera and the motion of that camera relative to the scene to simulate the existence of two cameras. The final output of these passive structure recovery systems is almost always depth (or range).

Computational stereo approaches generate depth estimates at some set of locations (or directions) relative to a reference frame. For two-camera approaches, these estimates are often given relative to the first camera's coordinate system. Sparse reconstruction systems generate depth estimates at a relatively small subset of possible locations, where dense reconstruction systems attempt to generate estimates for most or all pixels in the imagery.

Computational stereo techniques estimate a range metric such as depth by determining corresponding pixels in two images that show the same entity (scene object, element, location or point) in the 3D scene. Given a pair of corresponding pixels and knowledge of the relative position and orientation of the cameras, depth can be estimated by triangulation to find the intersecting point of the two camera rays. Once depth estimates are computed, knowledge of intrinsic and extrinsic camera parameters for the input image frame is used to compute equivalent 3D positions in an absolute reference frame (e.g., global positioning system (GPS) coordinates), thereby producing, for example, a 3D point cloud for each frame of imagery, which can be converted into surface models for further analysis using volumetric tools.

While it is "depth" which provides the intuitive difference between a 2D and a 3D image, it is not necessary to measure or estimate depth directly. "Disparity" is another range metric that is analytically equivalent to depth when other parameters are known. Disparity refers, generally, to the difference in pixel locations (i.e., row and column positions) between a pixel in one image and the corresponding pixel in another image. More precisely, a disparity vector $L(i,j)$ stores the difference in pixel indices between matching pixels in image $I_A$ and image $I_B$. If pixel $I_A(10,20)$ matches pixel $I_B(15,21)$, then the disparity is $L(10,20)=(15,21)-(10,20)=(5,1)$, assuming L is computed relative to reference frame $I_A$. Zero disparity means that pixel $I_A(m,n)$ corresponds to pixel $I_B(m,n)$, so $L(m,n)=(0,0)$. If camera position and orientation are known for two frames being processed, then quantities such as correspondences, disparity, and depth hold equivalent information: depth can be calculated from disparity by triangulation.

A disparity vector field stores a disparity vector at each pixel, and thus tells how to find the match (or correspondences) for each pixel in the two images. When intrinsic and extrinsic camera parameters are known, triangulation converts those disparity estimates into depth estimates and thus 3D positions relative to the camera's frame of reference.

An important problem in dense computational stereo is to determine the correspondences between all the pixels in the two (or more) images being analyzed. This computation, which at its root is based on a measure of local match quality between pixels, remains a challenge, and accounts for the majority of complexity and runtime in computational stereo approaches.

Academia and industry have provided many advances in automated stereo reconstruction, but the domain still lacks a general solution that is robust and deployable in real-world scenarios. A number of facets of potential general solutions remain open research problems. Runtime and efficiency continue to be challenges, as well as finding match quality metrics that are robust to low-quality imagery or changing scene conditions. Robustness to camera path changes and scene orientation are also issues.

Calibrated monocular aerial modeling is an application that has received somewhat less attention than other areas in computational stereo, and it lacks a generally applicable solution. In these applications, the camera typically follows an aerial platform's known but independently controlled path, with position and orientation changing incrementally between frames. A standard stereo geometry is not available and stereo groupings must be selected from within a set of buffered frames. Intrinsic and extrinsic camera parameters are typically known to a high degree of accuracy. Unlike some other applications, expected characteristics include large absolute ranges to the scene (hundreds or thousands of meters), large absolute disparities (tens or hundreds of pixels), and large disparity search ranges. Approaches encounter complex and uncontrolled outdoor scenes that may contain moving objects and are imaged under uncontrolled outdoor lighting. Images may also contain other various artifacts.

Reliable solutions in these areas would enable a wide variety of applications in the commercial, military, and government domains. Rapid passive modeling of urban or rural areas is valuable in itself for virtual training and virtual tourism, but that capability also enables improved tracking, surveillance, and change detection, supports disaster response, and facilitates more robust autonomous systems through visually-aided navigation, object recognition, and other follow-on processing.

SUMMARY

Embodiments described herein overcome the disadvantages described above. This advantage and others are achieved by a stochastic method for fast stereoscopic ranging. The stochastic method includes selecting a pair of images for stereo processing, in which the pair of images are a frame pair and one of the image is a reference frame, seeding estimated values for a range metric at each pixel of the reference frame, initializing one or more search stage constraints, stochastically computing local influence for each valid pixel in the reference frame, aggregating local influences for each valid pixel in the reference frame, refining the estimated values for the range metric at each valid pixel in the reference frame based on the aggregated local influence, and post-processing range metric data. A valid pixel is a pixel in the reference frame that has a corresponding pixel in the other frame of the frame pair. The method repeats n iterations of the stochastically computing through the post-processing. The value of n is selected in the initializing.

These advantages and others are also achieved by a computer readable medium including instructions for performing a stochastic method for fast stereoscopic ranging. The instructions perform the method by selecting a pair of images for stereo processing, in which the pair of images are a frame pair and one of the image is a reference frame, seeding estimated values for a range metric at each pixel of the reference frame, initializing one or more search stage constraints, stochastically computing local influence for each valid pixel in the reference frame, aggregating local influences for each valid pixel in the reference frame, refining the estimated values for the range metric at each valid pixel in the reference frame based on the aggregated local influence, and post-processing range metric data. A valid pixel is a pixel in the reference frame that has a corresponding pixel in the other frame of the frame pair. The instructions repeat n iterations of the stochastically computing through the post-processing. The value of n is selected in the initializing.

These advantages and others are also achieved by a system for stochastic fast stereoscopic ranging. The system includes a visual sensor capable of taking images and a computing device coupled to the visual sensor. The computing device includes a memory. The memory includes instructions for performing a stochastic method for fast stereoscopic ranging by selecting a pair of images for stereo processing, in which the pair of images are a frame pair and one of the image is a reference frame, seeding estimated values for a range metric at each pixel of the reference frame, initializing one or more search stage constraints, stochastically computing local influence for each valid pixel in the reference frame, aggregating local influences for each valid pixel in the reference frame, refining the estimated values for the range metric at each valid pixel in the reference frame based on the aggregated local influence, and post-processing range metric data. A valid pixel is a pixel in the reference frame that has a corresponding pixel in the other frame of the frame pair. The instructions repeat n iterations of the stochastically computing through the post-processing. The value of n is selected in the initializing.

These advantages and others are also achieved by a method for initializing depth estimates in an iterative process for stereoscopic ranging. The method includes projecting a first depth estimate for each one of a plurality of valid pixels in an image, the image having an implicit camera origin, generating a 3D representation of the plurality of valid pixels using the first depth estimate, relocating the implicit camera origin, reprojecting the 3D representation of the plurality of valid pixels to the relocated implicit camera origin, using Z-buffering to render a second depth estimate for each one of the plurality of valid pixels according to the relocated implicit camera origin, and using the second depth estimate for each of the plurality of valid pixels as an initial value in a subsequent iteration of a process for stereoscopic ranging.

DESCRIPTION OF THE DRAWINGS

The detailed description will refer to the following drawings, wherein.

DETAILED DESCRIPTION

Figure 1:
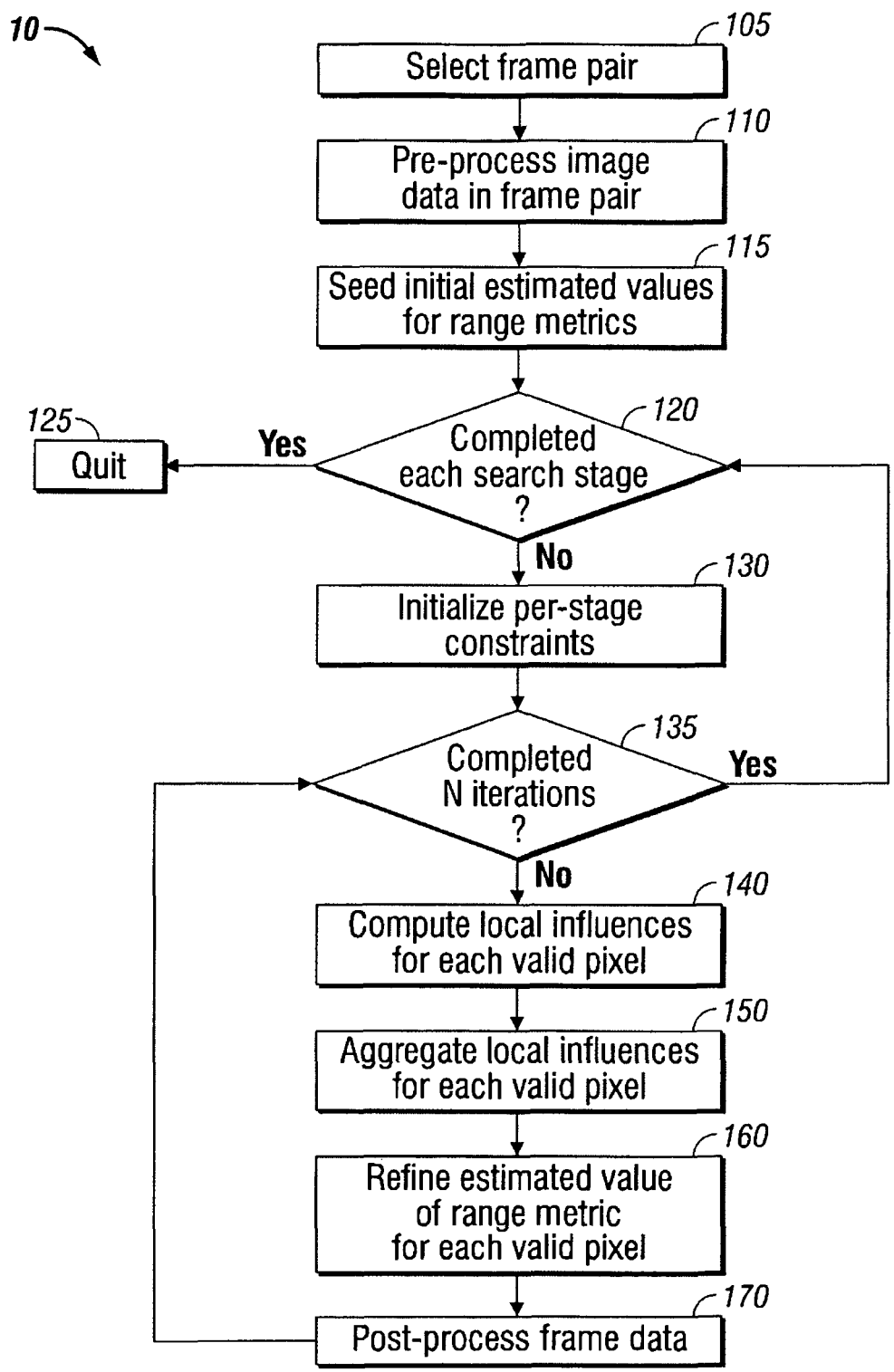
FIG. 1 is a flowchart illustrating an exemplary method for fast stereoscopic ranging.

Prior research has identified a number of related techniques. Cooperative techniques divide the complex correspondence matching problem into identical sub-problems at each pixel, and transfer information between the sub-problem solutions to achieve a global solution that is constrained by assumptions of continuity and uniqueness among the sub-problem solutions.

Stochastic techniques such as simulated annealing and microcanonical annealing search the solution space in a non-deterministic manner. Multi-view stereo systems process a sequence of many images in non-standard stereo geometries simultaneously. Finally, there are other existing approaches targeting real-time operation, which tend to use parallel architectures or other custom architectures. The inspirations provided by these related techniques are combined in the embodiments described herein in a new way to yield an approach with particular advantages. Existing cooperative approaches repeatedly apply local and non-local effects to iterate towards their solution. However, the cooperative approaches typically compute local match quality exhaustively (with respect to integer-valued disparities), they can consume considerable amounts of memory, and their memory and runtime can change with stereo geometry and scene geometry. Simulated annealing and other stochastic search approaches avoid an exhaustive sampling of potential local solutions, but still often quantize the disparity search space and can also be slow to converge. The embodiments described herein reduce computation by using an approach that is both cooperative and stochastic, and has advantages from both.

Cooperative and stochastic techniques are not obviously compatible. Cooperative approaches universally assume an exhaustive sampling of the solution space on which to base their calculations, but stochastic approaches intentionally avoid this exhaustive sampling. Stochastic approaches may consider non-local relationships in the solution when determining whether or not to explore a portion of the search space, but they do not directly incorporate the effects of one local sample of the search space into neighboring solutions. Using a combined cooperative and stochastic approach to gain the benefits of both, therefore, represents a non-obvious extension of the state of the art.

Existing multi-view systems are designed for operation on many images, and can be applied to monocular video imagery, but they typically process all available frames collectively in a batch, and thus are of little help for applications that require a more incremental and streaming solution. Existing is real-time stereo systems often make assumptions that are unattractive in some domains, for example assuming the use of two or more cameras in a fixed geometry (which would provide an insufficient stereo baseline on all but the largest of aerial platforms) or specialized hardware. By exploiting the piecewise continuity and continuity of matching likelihood constraints and by initializing each frame's estimate based on previous results, the embodiments described herein avoid exploration of large portions of the search space and allow range estimates to converge over multiple frame pairs, reducing runtime and providing an incremental structural estimate.

The embodiments described herein present a general approach that is easily applied to a variety of specific applications. One application area that is particularly well-suited to exploit these advances is the incremental dense reconstruction of man-made structures (buildings, roads, stationary vehicles, etc.) and natural backgrounds (e.g., hills, waterways, and trees) from sequences of monocular aerial video accompanied by intrinsic and extrinsic camera parameters. In more common applications (e.g., robotic navigation), the approach suffers no loss.

FIG. 1 is a flowchart illustrating an exemplary method 10 for fast stereoscopic ranging.

In block 105, a pair of images (or frames) $I_A(i,j)$ and $I_B(i,j)$ (where $i=1, 2, \ldots, i.sub.max$ and $j=1, 2, \ldots, j.sub.max$ are discrete pixel indices) are selected for processing from a video stream. Given this image pair, the more recent of the two, $I_A$, is defined to be the reference frame. These stereo pairs are formed by selecting non-adjacent frames in the input stream in a way that optimizes accuracy and insulates the algorithm from changes in platform motion. Using a technique described in R. Vidal and J. Oliensis, Structure form Planar Motions with Small Baselines, Proc. European Conference on Computer Vision, pp. 383-398 (2002), frames are paired to maintain a target ratio $\tau_0$ between the stereo baseline T and the expected minimum depth to the scene $$\min_{i,j}\{D(i,j)\},$$

defined by $$\tau_0 = T \min_{i,j}\{D(i,j)\}. \quad (1)$$

This target baseline ratio provides resilience from changes in platform speed or direction, making it possible to tune other parameters to a more consistent stereo geometry. The stereo baseline T is taken as the Euclidean distance between the two camera origins (without considering camera orientation or other more complex geometric factors that also affect the mapping from depth to disparity).

Figure 2A:
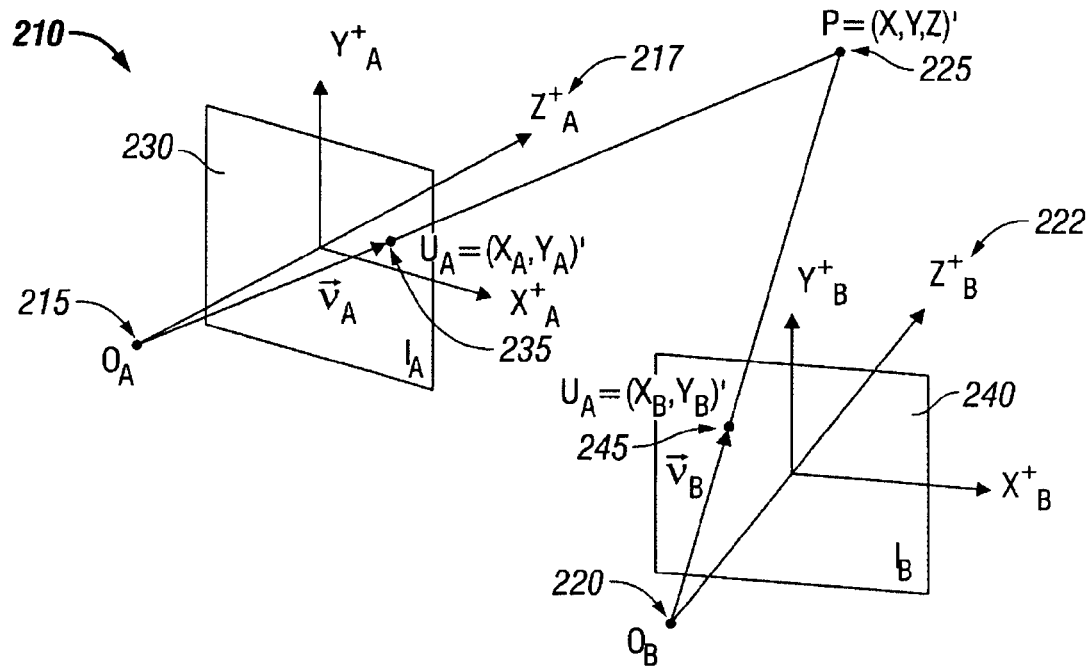
FIG. 2a illustrates a standard two-camera geometry.

FIG. 2a illustrates a general geometry 210 formed between two cameras, A and B, referred to as the left and right camera respectively. The camera origins $O_A$ and $O_B$ (215, 220) are shown, along with the principal camera axes $Z^+_A$ and $Z^+_B$ (217, 222), and image planes $I_A$ and $I_B$ (230, 240). The embodiments described herein apply the projective camera model, in which a point $P=(X,Y,Z)'$ (225) in 3D Euclidean space is projected onto a point $u_A=(x_A,y_A)'$ (235) in image $I_A$ through the relationship $$(x_A, y_A)' = (XZ, YZ)',$$

and similarly for camera B and image $I_B$ (point 245) This projection is typically modeled as a linear operator in a 3D projective geometry through the use of homogeneous coordinates $P_h=(x, y, z, w)'$ which are unique only up to the scaling factor w.

Within this geometry, given noise-free values for the camera positions, orientations, and the projections of the point onto the two image planes, the location of P in 3D Euclidean space can be recovered by computing the intersection of the two camera rays $\vec{v}_A$ and $\vec{v}_B$.

Figure 2B:
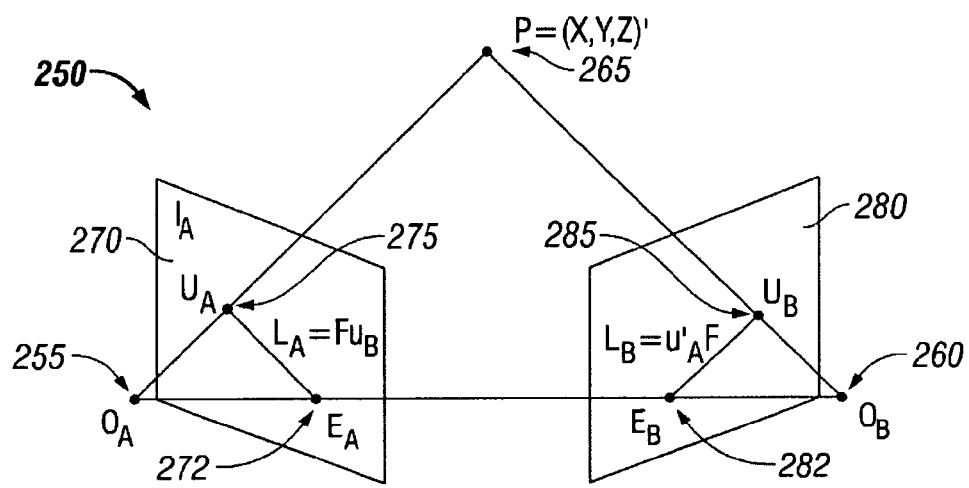
FIG. 2b illustrates the epipolar constraint.

FIG. 2b illustrates a fundamental characteristic 250 of this geometry called the epipolar constraint. The epipolar constraint is an important constraint in computational stereo because it removes a full dimension from the search space for each pixel's correspondence. Given two camera origins $O_A$ and $O_B$ (255, 260) and the projection of a point P (265) in 3D space onto one of their image planes, the projection of P onto the other image plane is constrained to lie on a specific line. The epipolar constraint states that the projections $u_A$ and $u_B$ (275, 285) of P onto image planes $I_A$ and $I_B$ (270, 280) are bound by the constraint $u'_A F u_B = 0$, where F is the 3×3 fundamental matrix, which can be computed directly from knowledge of the camera positions ($O_A$ and $O_B$), camera orientations, and intrinsic camera parameters such as field of view, resolution, et cetera. Further details regarding the fundamental matrix and the geometries and epipolar constraint discussed herein can be found in Hartley & Zisserman, Multiple View Geometry in Computer Vision, 2d ed. (Cambridge University Press 2003), which is incorporated here by reference.

The epipolar constraint restricts the projections of any point P such that independent of its depth or 3D position, given either u.sub.A or u.sub.B, the other projection must like on the corresponding epipolar line. Given u.sub.A, u.sub.B must lie on the line L.sub.B=u'.sub.AF, and given u.sub.B, u.sub.A must lie on the line L.sub.A=Fu.sub.B. The projections of one camera's origin onto the other's image plane is called an epipole (E.sub.A and E.sub.B) (272, 282), and all epipolar lines go through the epipole in their image plane.

Most two-camera computational stereo systems assume the use of a standard stereo geometry. The standard geometry requires that the rotations R.sub.A and R.sub.B of the two cameras with respect to world coordinates are identical, so there is no relative rotation between the two camera reference frames. This means the X.sup.+ axes of the two cameras are parallel, as are their Y.sub.+ and Z.sup.+ axes. Further, the standard geometry requires that the stereo baseline T or (O.sub.B−O.sub.A) is parallel to the X.sup.+ axis and is positive. As a result, in the standard stereo geometry, all epipolar lines coincide with the horizontal scanlines of the images.

Computational stereo estimates depth by determining corresponding pixels in two images that show the same point in the 3D scene and exploiting the epipolar geometry to compute depth. Given a pair of corresponding pixels and knowledge of the relative position and orientation of the cameras, depth can be estimated by triangulation to find the intersecting point of the two camera rays. Computational stereo approaches are based on triangulation of corresponding pixels, features, or regions within an epipolar geometry between two cameras. Triangulation is straightforward under certain stereo geometries and in the absence of errors in the correspondence estimate.

The standard stereo geometry is generally only physically achievable by using two cameras mounted on a common chassis. Single-camera approaches must achieve this geometry or another desirable stereo geometry via rectification. While rectification is not required in a computational stereo system, it can reduce overall computational complexity and/or improve the conditioning of the problem, and it is preferable for use in a single-camera approach. Rectification can improve conditioning by facilitating additional constraints on the solution or making the solution more robust to noise or error. To perform rectification, the epipolar geometry described above must be either known or estimated.

In a preferred embodiment, rectification is used to eliminate only the relative rotations between the two cameras, without transforming to a completely standard geometry, thereby creating the rectified paired image I.sub.BR. This can be accomplished through standard coordinate transforms for rotation, given knowledge of the relative orientation between the two cameras. As a result of this type of rectification, the direction of disparity for matching pixels becomes independent of depth, and the epipolar line for a left image pixel I.sub.L(r,c) will always pass through the right image pixel I.sub.BR(r,c). As another a result, scene elements at infinite depth exhibit zero disparity. This type of rectification can reduce computational complexity during the correspondence search. Other potential rectification strategies include two-frame projective rectification, which applies projective transforms to both images in a non-standard stereo geometry in order to convert them into a standard stereo geometry, and a vergent stereo geometry with non-parallel principal camera axes that intersect at a point of interest in the scene.

In an embodiment, a scalar floating-point depth value {circumflex over (D)}(i,j) is directly estimated at each pixel (i,j) in the domain of I.sub.A. In the pre-processing block 110 of an embodiment shown in FIG. 1, unit vectors {right arrow over (e)}(i,j) are pre-computed for each pixel in I.sub.A in the epipolar direction for the geometry between I.sub.A and I.sub.BR. The length of the disparity vector (k) for any estimated depth can be easily calculated, which makes it possible to convert between estimated depth {circumflex over (D)}(i,j) and an equivalent estimated disparity {circumflex over ({right arrow over (L)})}(i,j)=k {right arrow over (e)}(i,j) very quickly, in order to efficiently compute match quality samples Q(I.sub.A,I.sub.B;i,j, {circumflex over (D)}(i,j)) for any particular choice of local match quality metric Q(.cndot.) and any particular {circumflex over (D)}(i,j). This process also implicitly enforces the constraint that correspondences lie on the epipolar lines.

Following rectification in block 110 in FIG. 1, masks are constructed to identify pixels in I.sub.A(i,j) and I.sub.BR(i,j) that have been invalidated by any of a number of constraints, including: imagery artifacts, the constraint that I.sub.BR have the same pixel domain as I.sub.B (i=1, 2, . . . , i.sub.max and j=1, 2, . . . j.sub.max), that both pixels in a correspondence lie within the paired images, and also any known or assumed bounds on scene structure.

Figures 3A, 3B, 3C:
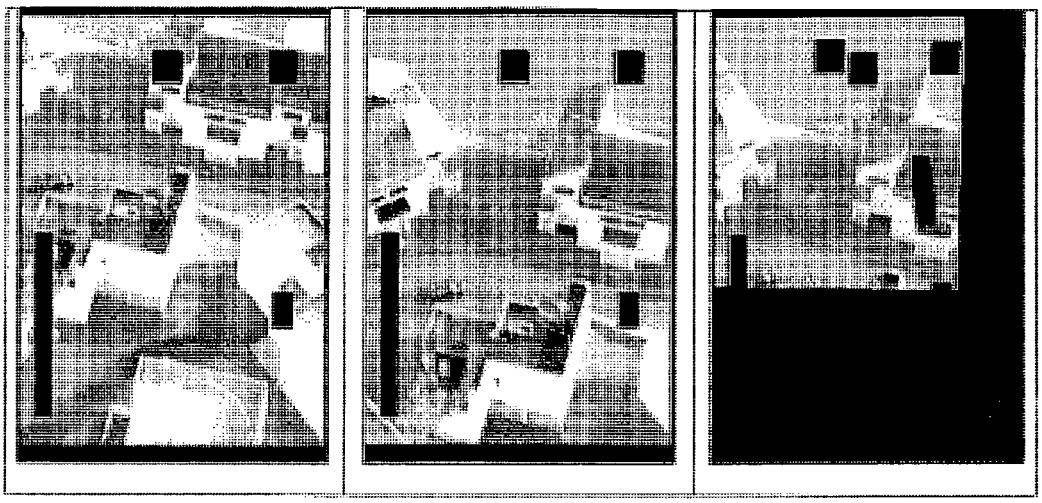
FIGS. 3a-3c are images illustrating example images masked for artifacts and image rectification.

FIGS. 3a through 3c illustrate the results of pre-processing and rectification on an exemplary image. FIG. 3a shows a reference image I.sub.A, masked for image artifacts. FIG. 3b shows paired image I.sub.B masked for image artifacts. FIG. 3c shows rectified paired image I.sub.BR, masked for image artifacts and rectification as described in the preceding paragraph.

Conservative application-specific assumptions about scene structure can considerably improve performance. Scene structure constraints and changes in stereo geometry cause the valid range of potential depths (and disparities) to be different for each frame pair, and also different at each pixel in a given frame pair. As an example, aerial modeling applications can benefit from loose assumptions on the minimum and maximum elevation in the scene to establish minimum and maximum depths, {circumflex over (D)}.sub.min (i,j) and {circumflex over (D)}.sub.max(i,j), at each pixel. Other applications with different categories of scenes, camera orientations, or camera motion will benefit from analogous but different constraints. Regardless of the specific scene structure assumptions, the depth and/or disparity ranges being estimated by the approach can vary frame-by-frame or pixel-by-pixel with no effect on runtime or memory consumption.

In block 110 (see FIG. 1), the images are preprocessed and certain data points are initialized. In block 115 of FIG. 1, each pixel (i,j) in the domain of I.sub.A is directly initialized (seeded) with an estimated floating point depth value. For each new frame pair, depth estimation at each pixel is initialized based on the final estimated value computed for the corresponding pixel in frame I.sub.A of the previous frame pair. Seeding allows the depth estimates to converge over multiple frame pairs in a style of recursive estimation. On each frame but the first, existing estimates are refined instead of generating entirely new estimates. As a result, the number of search iterations and runtime for each frame are reduced even further, and search schedules with smaller perturbations and aggregation neighborhoods can be used to retain detail in the estimates.

Depth estimates can be seeded very aggressively since the camera position and orientation are assumed known and will differ little between adjacent frames. For each new frame pair, the most recent depth estimates are re-projected to the new reference frame and adjusted for changes in camera origin. Preferably this is done using a Z-buffering algorithm to address occlusions or de-occlusions introduced by camera motion. The vast majority of pixels can be initialized with this process. Small gaps in coverage are filled using nearest-neighbor interpolation with a small structuring element. Where there are no initial values with which to seed a pixel (such as in the initial frames when the algorithm begins), the pixel can be initialized using an appropriate application-specific heuristic (e.g., a default elevation). Aggressively seeding the stochastic cooperative search lets the estimates converge over multiple stereo image pairs, so the number of iterations for each frame pair can be reduced further, again reducing the number of evaluations of match quality and reducing runtime and improving accuracy.

Figure 4A:
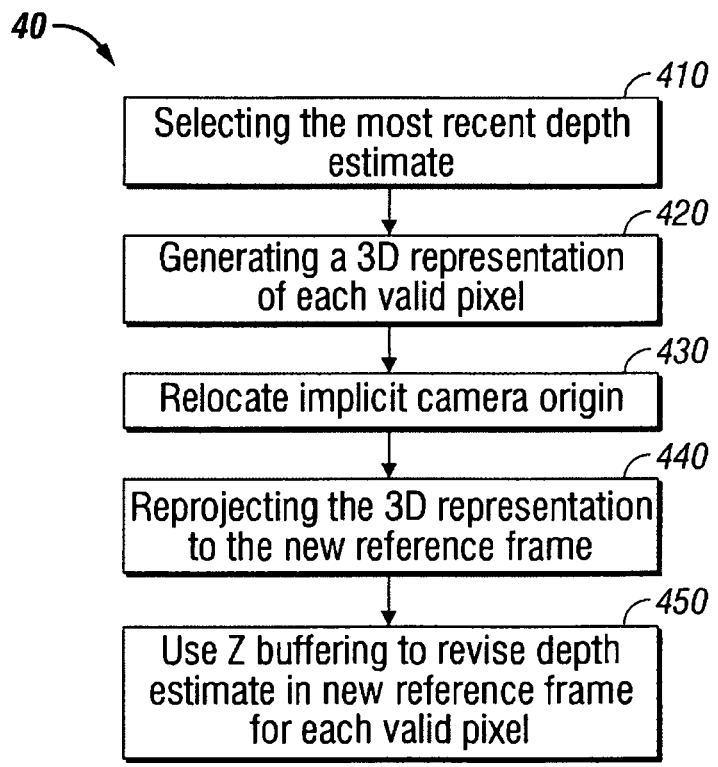
FIG. 4a illustrates an exemplary method of initializing depth estimates in an iterative process for stereoscopic ranging.

FIG. 4a illustrates an exemplary method 40 of initializing depth estimates in an iterative process for stereoscopic ranging. In block 410 the most recent (or most current) depth estimates are selected. Preferably the most recent depth estimate is the final estimated value for the corresponding pixel in the reference frame I'.sub.A for the previous frame pair. In block 420 a 3D representation of the location for each pixel is generated using the most recent depth estimate. Exemplary 3D representations include a point cloud or arrays of 3-tuples representing coordinates of the pixel in 3D space. The previous reference frame I'.sub.A defines a camera origin, and in block 430 the camera origin is relocated to the origin of the current reference frame I.sub.A. One potential consequence of the movement of the camera is that objects in the 2D image may become occluded or de-occluded, and preferably the depth estimates can be adjusted to account for such occlusion or de-occlusion.

In block 440, the 3D representation for the scene location for each pixel is re-projected to its 2D location in reference frame I.sub.A via the projective camera model described above. In block 450 a Z-buffering algorithm is used to generate a new set of depth estimates at each pixel in the current reference frame I.sub.A from the depths of the 3D scene locations and their 2D locations in reference frame I.sub.A. Z-buffering is a technique from the domain of computer graphics that is used to generate realistic images of scenes that contain many objects, some of which occlude others and thus prevent them from being visible. Z-buffering conditionally draws the color of each scene element pixel-by-pixel to the image, displaying it at a given pixel only if it is located at a range less than that of the currently-drawn scene element at that pixel. The approach is named for the record of the ranges of currently-drawn scene elements at each pixel, which is called the "Z buffer". These ranges are not drawn to the screen in existing applications of Z-buffering. The Z-buffering algorithm is applied in a novel way to "draw" the seed values for a given frame pair such that new occlusions and de-occlusions that are generated by the camera's motion between adjacent frames are reflected accurately in the seed values. This is conceptually the equivalent of "drawing" the Z buffer to the screen directly.

Figure 4B:
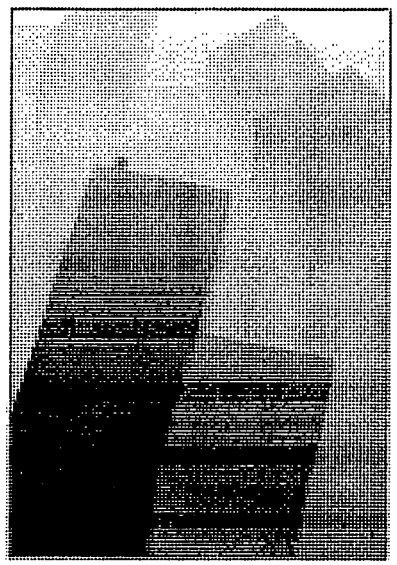
FIGS. 4b-4c are images that illustrate seeding depth estimates.
Figure 4C:
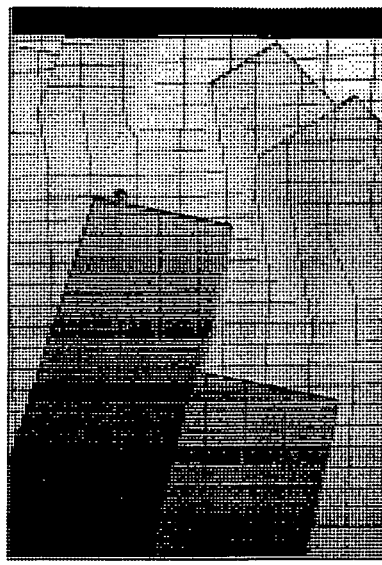

The depth estimates for some pixels in the new 3D representation may have been changed as a result of the application of Z-buffering. These new depth estimates are used, in block 450 of FIG. 4a, to seed the initial depth estimate values in the reference frame I.sub.A in block 115 of FIG. 1, FIGS. 4b and 4c illustrate the seeding process. FIG. 4b shows example depth estimates from a previous frame pair that will be used for seeding via Z-buffering, where example depth values in reference frame I'.sub.A are pseudocolored by depth (larger depths are colored more brightly). FIG. 4c shows those depths re-projected to a new reference frame I.sub.A through Z-buffering. Most but not all pixels in reference frame I.sub.A are initialized by selecting and adjusting the appropriate estimate from frame I'.sub.A. The examples I'.sub.A and I.sub.A in FIGS. 4b and 4c are 10 frames distant for better visualization of the is parallax effects that cause gaps in the set of pixels that can be initialized through Z-buffering. Seeding via Z-buffering is preferably applied to adjacent reference frames so these gaps will be smaller or nonexistent.

After the pre-processing and seeding of initial estimates comes a novel combination of stochastic and cooperative search techniques used to explore the space of potential depth estimates. In an embodiment the method proceeds through a finite number of search stages, preferably four.

Block 120 is the beginning of the loop that iterates through the different search stages, beginning with stage 1. After the process has completed iterating through all search stages, control passes to block 125 (QUIT). At this point there is a refined depth estimate for each valid pixel in the reference frame.

Optionally, the estimated depth value or other image data can be visually displayed on a display device such as a monitor. An exemplary method of displaying depth values is a point cloud, i.e., a set of points in 3D space (or simulated 3D space) in some coordinate frame. Another exemplary method is a depth image, where depth estimates are displayed at their corresponding pixel location in the camera's reference frame and are pseudocolored by the estimated depth. Yet another embodiment is a surface model, in which structures in the scene are represented as a collection of piecewise-smooth surfaces.

For each search stage the method proceeds through N iterations, where N preferably is different in each stage and is selected to allow estimates to converge in each stage. In block 130 a value for N is determined. Also initialized in block 130 are other constraints that vary depending on the search stage, including preferably maximum depth perturbation magnitude .delta..sub.max and aggregation neighborhood W, described in more detail below.

Block 135 of FIG. 1 is the first block of each iteration of the search stage. If the N iterations have been completed for the search stage, control returns to block 120 to begin the next search stage. If N iterations have not yet been completed, the process performs the next iteration, beginning with block 140.

In an embodiment, the method stores a range metric for each pixel in the form of an estimated point depth value. In block 140, a local influence is computed for each pixel. In an embodiment a random (or stochastic) perturbation is injected into each pixel's depth estimate. The local match quality corresponding to the perturbed estimate is computed, as well as the influence that the new sample of the local match quality function should exert on the local region (which may be either towards or away from the perturbed depth estimate). In block 150 local influences are aggregated in a cooperative approach to eliminate noise and extract consistent trends in the match quality values, driving the new set of depth estimates towards the correct depth values. An embodiment of the approach uses relatively straightforward iterations of random perturbation and smoothing with a novel non-linear formulation of per-pixel and aggregated influences that pull the depth estimates towards a better solution without evaluating local stereo match quality at every possible depth.

Using a floating point estimated depth value as the range metric in the method 10 is in contrast with other approaches that estimate discrete disparity values for the reference frame and then post-process to recover sub-pixel disparity estimates and finally depths. Estimating floating-point depths directly is preferable in cases involving large depth or disparity ranges, or ranges that vary significantly pixel-to-pixel. It also avoids quantizing the estimated values and also facilitates the use of local match quality metrics defined on continuous domains.

Figure 5:
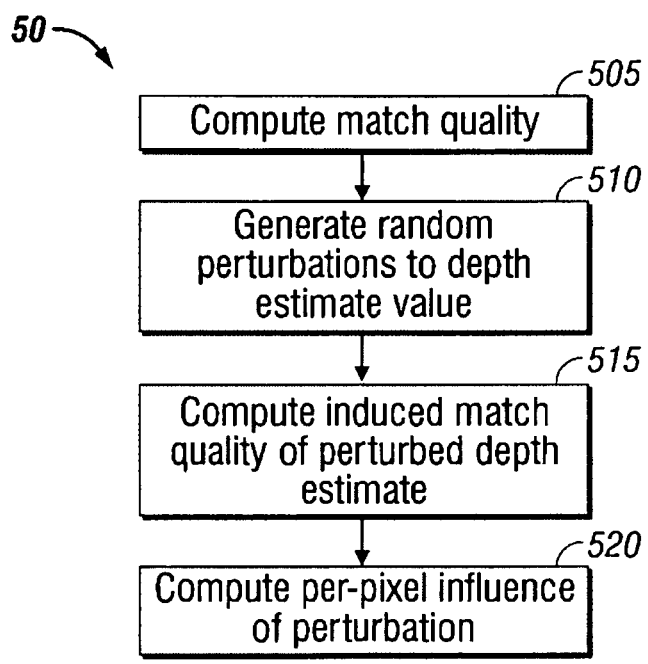
FIG. 5 is a flowchart illustrating an exemplary method for computing local influence based on direct estimates of depth.

FIG. 5 shows the steps of computing a local influence (i.e., block 140 in FIG. 1) for each valid pixel in image $I_A$. The "valid" pixels are those pixels in image $I_A$ that have corresponding pixels in image $I_{BR}$, meaning those pixels which have not been invalidated for any reason. Possible reasons for invalidation of corresponding pixels in image $I_{BR}$ include image artifacts in $I_{BR}$ and disparity values that cause the corresponding pixel to lie outside of the rectified image.

Block 505 in FIG. 5 computes match quality at pixel (i,j). Generally speaking, match quality is a local metric that measures how closely a pixel location in image $I_A$ matches a pixel in image $I_{BR}$. Match quality should be high when the two pixels are showing the same object, and low when the two pixels are showing different objects. The match quality function on a particular $I_A$, $I_{BR}$, pixel at (i,j), depth estimate and local match function Q ( ) is denoted:

$$q_n(i,j) = Q(I_A, I_{BR}, i, j, \hat{D}(i,j)) \quad (2)$$

Preferably the match quality function used is the "sum of absolute differences" (SAD), which is a simplified measure of correlation between the local regions surrounding the pixels $I_A$ and $I_{BR}$. To compute the SAD value, a region is selected about the pixel of interest in frame $I_A$ preferably between $3 \times 3$ and $5 \times 5$ pixels; the similar-sized region surrounding the corresponding pixel in $I_{BR}$ is located; and the absolute value of the differences between each pixel in the region in $I_A$ and the corresponding pixel in the region in $I_{BR}$ are summed. Other match quality functions that can be used include the sum of squared differences, local correlation, local mutual information, and similarity of responses to oriented Gaussian filters.

In order to evaluate the match quality function, the depth estimates for each pixel must be converted to disparity values. Disparity typically is not used inside the match quality function Q, but the disparity information is required to identify which pixels in $I_A$ and $I_{BR}$ are to be compared with the match quality function.

In block 510 of FIG. 5, the depth estimate at pixel (i,j) is stochastically perturbed with additive noise $$\tilde{D}_n(i,j) = \hat{D}_{n-1}(i,j) + \Delta D_n(i,j). \quad (3)$$

On each iteration in an embodiment, the noise $\Delta D_n(i,j)$ that is applied to each pixel's depth estimate is drawn from a uniform distribution subject to a set of pixel-specific constraints. In alternative embodiments, the noise may be drawn from other distributions, e.g., a normal distribution or an exponential distribution. The search schedule (described below) defines a maximum depth perturbation magnitude $\delta_{max}$ for each iteration. This limit is preferably large for early iterations and gradually shrinks in later iterations. The limit $\delta_{max}$ is defined on the normalized range [0,1] and is scaled by the depth search range for each pixel to establish the constraint $$\Delta D_n(i,j) \epsilon\; \text{left brkt-bot.} -\Delta D_{max}(i,j), \Delta D_{max}(i,j)\; \text{right brkt-bot.}, \quad (4)$$

where $$\Delta D_{max}(i,j) = \delta_{max}(\{\hat{D}\}_{max}(i,j) - \{\hat{D}\}_{min}(i,j)). \quad (5)$$

Perturbations are also constrained such that the perturbed depth estimate $\tilde{D}_n(i,j)$ is guaranteed to lie within the pixel-specific depth estimate bounds:

$$\Delta D_n(i,j) \epsilon\; \text{left brkt-bot.} \{\hat{D}\}_{min}(i,j) - \hat{D}_{n-1}(i,j), \{\hat{D}\}_{max}(i,j) - \hat{D}_{n-1}(i,j)\; \text{right brkt-bot.}. \quad (6)$$

These constraints are introduced before sampling from the noise distribution, instead of sampling from the distribution and then clipping, to avoid sampling $\{\hat{D}\}_{min}(i,j)$ and $\{\hat{D}\}_{max}(i,j)$ more often than other depth values, which introduces a bias towards depth estimates on extreme ends of the search range.

In block 515 of FIG. 5, the induced local match quality $\tilde{q}_n(i,j)$ is evaluated according to $$\tilde{q}_n(i,j) = Q(I_A, I_{BR}, i, j, \tilde{D}_n(i,j)), \quad (7)$$

The induced local match quality is the result of the match quality function applied at pixel (i,j) with perturbed depth estimate $\tilde{D}_n(i,j)$.

In block 520 the resulting per-pixel influences $J^*_n(i,j)$ of the perturbed estimate are computed. Each new sample of local match quality has the potential to exert influence on the local solution. The sign and magnitude of $J^*_n(i,j)$ are determined considering the change in local match quality $$\Delta q_n(i,j) = \tilde{q}_n(i,j) - Q(I_a, I_{BR}, i, j, \hat{D}_{n-1}(i,j)) \quad (8)$$

resulting from the random perturbation, as well as the sign and magnitude of the perturbation, as described further below.

For each pixel (i,j), per-pixel influence $J^*_n$ is defined as $$J_n^* = \Delta D_n (w_1 + w_2)\, (9)\quad w_1 = \max(C_1 \tilde{q}_n - (C_1 - 1), 0) \text{ with preferably } C_1 \approx 10\, (10)$$
$$w_2 = \Delta q_n / \max_{i,j} \Delta q_n. \quad (11)$$

This definition of $J^*_n(i,j)$ has proven effective. The maximum operation in (10) ensures that only samples with high match quality are given influence. The normalization in (17) ensures that $w_2$ is bound from above by 1.0 and achieves that value for at least one pixel in each iteration. Thus this definition of $J^*_n$ aligns it appropriately with the depth perturbation, selectively weights high-quality matches, preserves influence magnitudes when approaches zero, and prevents large influences from causing instability in the estimate. Preferably the per-pixel influence is calculated for each valid pixel in $I_A$ before proceeding to aggregation of the per-pixel values in block 150 in FIG. 1.

Returning to FIG. 1, in block 150 per-pixel influences $J^*_n(i,j)$ are aggregated over a local support region W to form the aggregated influence $J_n(i,j)$; and in block 160 the aggregated influence $J_n(i,j)$ is used to refine the depth estimates of each pixel towards a better solution according to $$\hat{D}_n(i,j) = \hat{D}_{n-1}(i,j) + J_n(i,j). \quad (12)$$

To aggregate influence, simple averaging over the local window W performs acceptably and can be implemented very efficiently. Anisotropic filtering approaches have also been applied to prevent loss of detail along boundaries. Averaging enforces a smoothness constraint while anisotropic filtering enforces a piecewise-smoothness constraint. Robust aggregation approaches, including order-statistic filtering or voting, could also be applied.

The aggregation neighborhood is preferably defined in terms of the average of the resolution in rows and columns in the images, $$\mu.res = R + C2. \quad (13)$$

In block 170 of FIG. 1, the frame data is post-processed prior to beginning a new iteration (or new search stage). Preferably depth estimates are smoothed in each iteration over the same local support region, W, to help propagate influences through the solution more quickly.

Control returns to block 135 to begin a new iteration. Preferably blocks 150 and 160 are completed for all valid pixels in I.sub.A before beginning block 170.

Standard image processing algorithms such as smoothing and edge detection can be used on both 2D depth images in block 170 and with the per-pixel influences J*(i,j) in block 150, in order to remove noise in the 3D structure estimate or to otherwise enhance results. These operations can be applied more easily to depth and influence than to disparity because depth has a more direct relationship with scene structure than disparity (which is also heavily influenced by stereo geometry).

In contrast with the vast majority of approaches, the approach described herein avoids computing Q(.cndot.) exhaustively by stochastically sampling it and using local aggregation to extract consistent trends caused by the piecewise-continuous structure of the scene and the continuity of matching likelihood constraint. Even if it were desirable, it would be impossible to truly compute Q(.cndot.) exhaustively over all possible floating-point values. Instead, non-exhaustive and non-uniform sampling reduces the number of evaluations of Q(.cndot.) required to compute an accurate estimate, and it facilitates the use of match quality metrics defined on non-integer disparities.

Influence has a small set of general requirements. When an acceptable solution has not been reached, influence (both per-pixel and aggregated) should tend to have sign and magnitude such that adding it to {circumflex over (D)}.sub.n−1 (i,j) moves {circumflex over (D)}.sub.ni,j) closer to the true solution. Aggregated influence J.sub.n(i,j) must tend towards zero when an acceptable solution is reached. Consistent trends in Q(.cndot.) should be captured and inconsistent noise rejected by the influence formation and aggregation process.

Figure 6A:
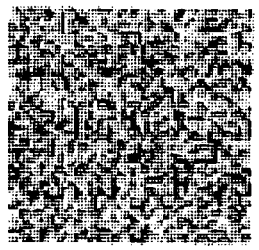
FIGS. 6a through 6d show a series of image components illustrating a region of random depth perturbations, resulting changes in match quality, resulting pixel-wise influences, and aggregated influences.
Figure 6B:
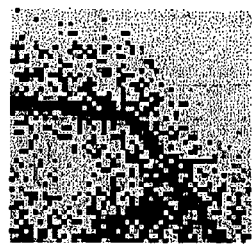
Figure 6C:
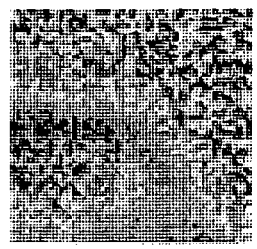
Figure 6D:
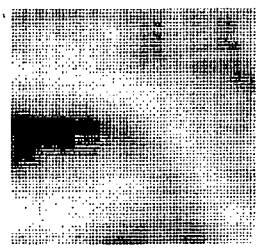

FIGS. 6a-6d illustrate the progression of the method described herein. FIG. 6a shows an example region of random depth perturbations .DELTA..sub.D.sub.n(i,j) (pseudo-colored in grayscale); FIG. 6b shows corresponding changes in match quality .DELTA..sub.q.sub.n(i,j); FIG. 6c shows per-pixel influences J*.sub.n(i,j); and FIG. 6d shows aggregated influences J.sub.n(i,j). Pre-perturbation depth estimates {circumflex over (D)}.sub.n−1(i,j) are typically smooth, with smoothly-varying match qualities. Randomly perturbing the depth estimates generates a "noisy" {tilde over (q)}.sub.n(i,j) and .DELTA..sub.q.sub.n(i,j). The role of per-pixel influence is to reflect the information gained by the new sample of the match quality function. Per-pixel influence are positive for perturbations that increase both match quality and the depth estimate, and negative for perturbations that increase match quality by decreasing the depth estimate. When perturbation decreases match quality, per-pixel influence is either zero or of the opposite sign of the perturbation.

By selectively weighting perturbations that improve the solution and aggregating over a local neighborhood, the approach refines the estimates towards a better solution. Randomness nearly ensures that some perturbations will increase depth and some will decrease depth. It is similarly very likely that some match quality values will increase due to the depth perturbation, and others will decrease. The role of influence aggregation is to extract from the noisy .DELTA..sub.q.sub.n (i,j) consistent trends that reflect the scene's underlying structure.

In an alternative embodiment, the range metric which is locally perturbed is disparity estimates rather than depth estimates. Preferably the direction of each pixel's epipolar line is known through knowledge of camera positions and orientations. As a result, the embodiment can pre-compute unit vectors along the epipolar directions and represent the estimated correspondences by a scalar-valued disparity magnitude field D(r,c) (where (r,c) refer to (row,column)). Infinite depth results in zero disparity as a result of the preferred rectification scheme described earlier. The search is bound by conservative assumptions on the minimum and maximum elevation of elements in the scene. As a result, each pixel can have different disparity bounds.

Figure 7:
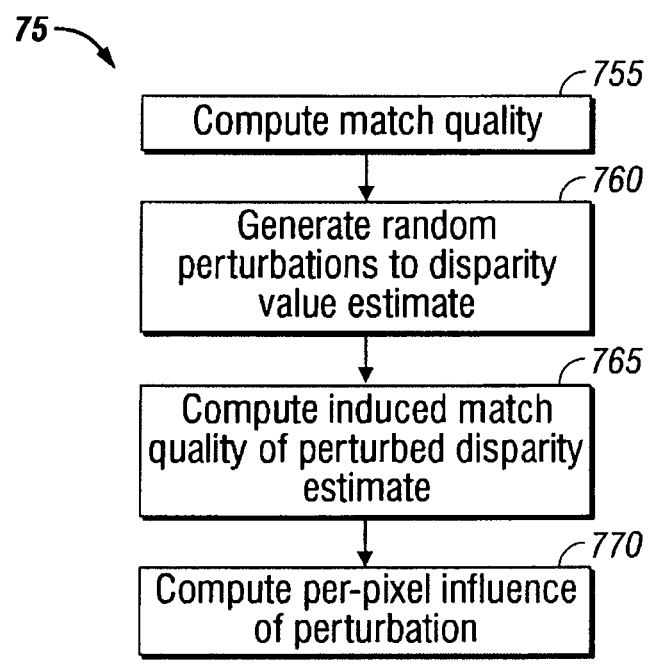
FIG. 7 is a flowchart illustrating the steps of an exemplary method of computing local influence based on direct estimates of disparity.

Except for seeding estimated values and computing local influence for each valid pixel (blocks 115 and 140), the method of the alternative embodiment is the same as shown in FIG. 1, except using a scalar-valued disparity estimate instead of a depth estimate. The initial values are seeded with estimated disparity magnitude at each pixel. FIG. 7 illustrates the computation of local influence for each valid pixel in the alternative embodiment based on the disparity estimate D.sub.i(r,c). In block 755, match quality is computed using a match quality function q.sub.i(r,c,D.sub.i(r,c)). In block 760, the disparity estimate D.sub.i(r,c) is randomly perturbed, e.g., as described above, with an independent uniformly distributed random perturbation .DELTA..sub.di, where .DELTA.-.sub.di(r,c).epsilon.[−.delta..sub.max,.delta..sub.max] .andg−ate.[−D.sub.i(r,c),D.sub.max(r,c)−D.sub.i(r,c)] at each pixel to generate {tilde over (D)}.sub.i(r,c)=D.sub.i(r,c)+ .DELTA..sub.di(r,c). In block 765 the induced match quality of the perturbed disparities is generated, {tilde over (q)}.sub.i (r,c, {tilde over (D)}.sub.i(r,c)). In block 770 the local influence I*.sub.i(r,c) to be exerted by each new sample {tilde over (q)}.sub.i(r,c, {tilde over (D)}.sub.i(r,c)) is computed. The sign and magnitude of the influence are based on the sign and magnitude of the random perturbation, as well as its resulting effect on the match quality at that pixel. These pixel-wise influences are then aggregated over a local region W and applied to D.sub.i(r,c) to move it towards the correct solution as described in block 150 of FIG. 1.

Yet another embodiment uses normalized disparity (or "percent disparity") estimates as the range metric. Use of normalized disparity value retains most of the advantages of estimating depth directly and can execute marginally faster. Instead of estimating disparity magnitude at each pixel, the minimum and maximum possible disparity at each pixel (which does not change in a given frame pair) are stored; and then a value between 0.0 and 1.0 is estimated for every pixel that is a percentage of the range between the minimum and maximum possible disparity values. Converting between the two forms of disparity is a straightforward calculation of:

$$D(m,n) = D.\text{sub.min}(m,n) + ND(m,n) * (D.\text{sub.max}(m,n) - D.\text{sub.min}(m,n)), \text{ and}$$

$$ND(m,n)=(D(m,n)-D.\text{sub.min}(m,n))/(D.\text{sub.max}(m,n)-D.\text{sub.min}(m,n))$$

where D( ) is disparity, D.sub.min ( ) is minimum disparity, D.sub.max ( ) is maximum disparity, and ND( ) is normalized disparity (a.k.a. "percent disparity"). This alternative embodiment normalizes D(r,c) over the allowed bounds at each pixel, yielding a normalized disparity on the range [0.0, 1.0]. This normalized disparity is also equal to a "percent elevation" over the assumed minimum and maximum elevation range.

The stochastic search of the embodiments described herein is regulated by a search schedule analogous to the annealing schedule in simulated annealing, or the training schedule in self-organizing feature map construction. The schedule defines values for the maximum depth perturbation magnitude .delta..sub.max, aggregation neighborhood W, and number of iterations N for each search stage.

Search schedules preferably have a set of characteristics driven by their need to be robust while preserving detail in the scene. Maximum depth perturbation magnitude .delta..sub.max is preferably specified as a percentage of the absolute depth search range (which varies for each pixel). Aggregation neighborhood size W is preferably specified as a fraction of image resolution. Schedules preferably tend to have few stages, with larger perturbations and aggregation neighborhoods in early stages and smaller values in later stages. Using a fixed number of iterations in each stage also allows explicit control of the tradeoff between accuracy and runtime.

An example of a preferable search schedule for all frame pairs but the first in is as follows:
TABLE-US-00001 Stage 1 Stage 2 Stage 3 Stage 4 N 4 6 8 8 W Square(.mu..sub.res/30) Square(.mu..sub.res/40) Square (.mu..sub.res/60)Square(.mu..sub.res/120).delta..sub.max 0.25 0.15 0.10 0.05
Where the neighborhood W is defined in teems of a image processing function "Square" that takes as input a single length and generates a neighborhood function (also commonly called a structuring element) defining a square with each side of the specified length. A different schedule is preferably applied to the first frame pair in order to emphasize larger perturbations and aggregations.

Figure 8:
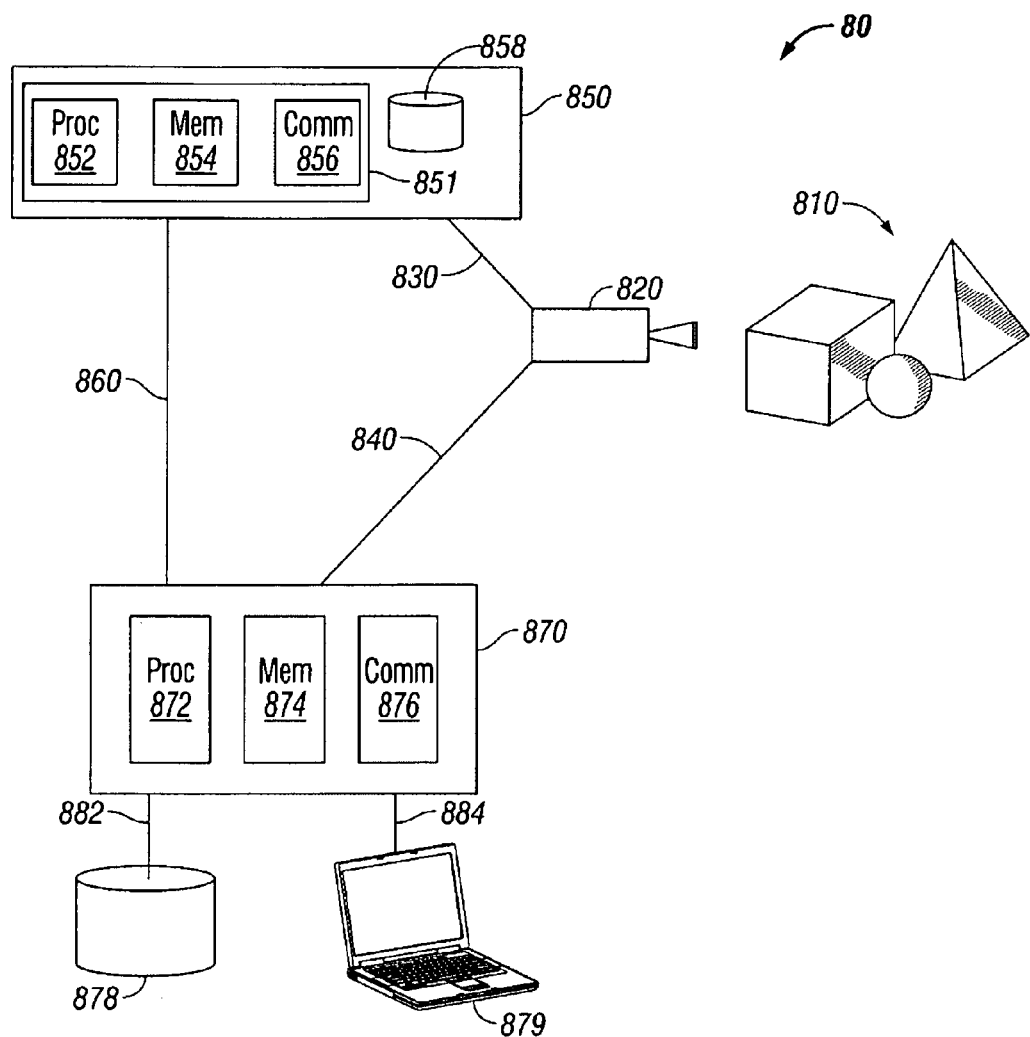
FIG. 8 illustrates an exemplary system for fast dense stereoscopic ranging.

FIG. 8 illustrates a high-level view of components of an exemplary system 80 for fast stereoscopic ranging, comprising one or more visual sensors 820, computing device 870 and optional platform 850

Also depicted in FIG. 8 is a three-dimensional scene 810. Three-dimensional scene 810 can include any scene containing three-dimensional objects. An exemplary and non-limiting list of examples includes: planetary and geographic features such as continents, oceans, islands, ice formations, volcanoes, forests and jungles, mountains and rivers; population areas such as cities or towns; ports, tunnels, airports, towers, bunkers, streets, highways, roads, bridges, houses, buildings, roads, and other man-made structures; ships, planes, rockets, cars, trucks and other vehicles; structures, people or objects in an internal space (e.g., a room, cave or body cavity) or external space (e.g., a plaza); underwater objects, including submarines or reefs; and facial and other identifying features of people.

Visual sensor 820 includes an sensor that can produce a 2D image of a 3D object and includes passive staring visual sensors such as, for example, the common visible-light camera and video camera and other sensors that capture images in the visible light spectrum, and electro-optic (EO) sensors that operate on other wavelengths like infrared, ultraviolet, multispectral, or hyperspectral. Visual sensor 820 can be adapted and configured to transmit live images in real time or to store images (such as on digital video tape, flash memory or other media) for non-real-time processing. Each visual sensor 820 will have associated intrinsic parameters (e.g., focal length, resolution, field of view, principal point, skew, radial distortion, et cetera) and extrinsic parameters (e.g., absolute position in terms of global positioning system (GPS), and orientation), which preferably are monitored and stored in system 80.

The system 80 includes one or more visual sensors 820. The methods described herein work by synthesizing information from two or more different (but related) 2-D images of the same three-dimensional scene 810. The two or more different images can be captured by a single (monocular) visual sensor which is displaced, relative to three-dimensional scene 810, in time and/or space, such as, for example, a single video camera mounted on an unmanned surveillance drone that captures a stream of video image frames of an object during a flyover. Preferably any visual sensors used as a monocular is visual sensor is adapted and configured to generate sequential 2-D image frames with incremental changes in viewpoints such as would be generated, for example, by a video camera. Alternatively the two or more different images can be captured by two or more different visual sensors that are displaced relative to each other and three dimensional scene 810 in time and/or space, such as, for example two separate video cameras pointed at the same object at a 45 degree offset. If two or more different visual sensors are used, preferably the visual sensors are aligned so as to avoid the need for rectification.

System 80 includes one or more computing devices 870 preferably implemented as a general-purpose computing device in the form of a computer comprising one or more processing units 872, a system memory 874 comprising computer storage media, a communications unit 876, optional storage device 878 and display device 879, and a system bus that couples the various system components including the system memory 874 to the processing units 872.

The system 80 optionally includes a platform 850. Platform 850 preferably comprises one or more computing devices 851 comprising one or more processing units 852, system memory 854 comprising computer storage media, communications unit 856, optional storage device 858 comprising computer storage media, and a system bus that couples the various system components including the system memory 854 to the processing units 852.

Alternatively computing devices 870 and 851 can be implemented as a special-purpose computer designed to implement the method for fast dense stereoscopic ranging described herein.

The selection and conglomeration of the components of computing device 870 and platform 850 is within the knowledge of the person of ordinary skill in the art. What follows is a non-limiting description of exemplary embodiments of the system components.

The computing devices 870 and 851 typically include a variety of computer readable media. Computer readable media can be any available media that can be accessed by computer and includes both volatile and nonvolatile media, removable and non-removable media. Computer readable media provide storage of software, computer readable instructions, data structures, program modules and other data for the computer, including an operating system, application programs, other program modules and program data. By way of example, and not limitation, computer readable media may comprise computer storage media and communication media.

The phrase "computer storage media" is intended to include both volatile and nonvolatile, removable and non-removable media implemented in any method or technology for storage of information such as computer readable instructions, data structures, program modules or other data. Computer storage media includes, but is not limited to, RAM, ROM, EEPROM, USB drives, memory sticks, flash memory or other memory technology, CD-ROM, digital versatile disks (DVD) or other optical disk storage, magnetic cassettes, magnetic tape, hard disks, magnetic disk storage or other magnetic storage devices, or any other medium which can be used to store the desired information and which can be accessed by the computer.

The term "communication media" typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as satellite, microwave, acoustic, RF, infrared and other wireless media. Combinations of any of the above should also be included within the scope of computer readable media.

Processing units 872 and 852 can include one or more conventional processors, configured in a single-core or multi-core arrangement. Alternatively, computing devices 870 and 851 can include multiple processors configured to operate in parallel; indeed, the method described herein is well-suited to parallel implementation because use of nonlocal methods (such as inhibition) can be avoided or minimized in embodiments.

System memories 874 and 854 preferably comprise RAM and/or other computer storage media coupled to processor(s) 872 and 852 and adapted and configured for storing the software instructions embodying the method described herein, the data used in the method, including the per-pixel estimated range metrics and other meta-data regarding each pixel of frame data, intrinsic and extrinsic parameters of visual sensors 820, and other information used in the system. Preferably there is sufficient memory to simultaneously store all estimated range metric estimations for at least two iterations of the method.

Communications modules 876 and 856 comprise communications media including but not limited to the hardware and software required to implement the communications protocols used to communicate and to exchange data with visual sensors 820, computing device(s) 870, and/or platform 850. Exemplary communications protocols supported by communications module 876 and 856 include TCP/IP, HTTP, Ethernet, video connection (e.g., digital video or IEEE 1394), and wireless networking protocols (e.g. 802.11). If visual sensor 820 is an analog device (such as a composite video camera), communications module 876 and 856 include a video card operative to digitize and store the incoming video frames.

System 80 optionally comprises a communications link 840 for communicating image data and control data between visual sensors 820 and computing device 870. Communications link 840 can include a wired or wireless connection between visual sensors 820 and computing device 870, such as, for example, a digital video connection under the IEEE 1394 protocol, to enable real-time transmission of image data from visual sensor 820. Alternatively, communications link 840 can be as simple as an input device operative to read images stored on media by visual sensor 820, such as, for example, a digital videotape created by a digital videotape recorder.

Computing device 870 optionally is coupled via link 882 to one or more storage devices 878. Storage device 878 comprises computer storage media and can be used to store image date generated by visual sensor 820. Computing device 870 optionally is coupled via link 884 to one or more display devices 879. Storage device 878 comprises a standalone PC, a workstation, a dumb terminal, and can be used to view image data generated or used by system 80. Links 882 and 884 can comprise a local connection or remote connection via a local area network, wide area network or the Web using protocols known to those of skill in the art.

Computing devices 870 and 851 can operate as one computing device in a standalone environment or in a networked environment using logical connections to one or more remote computing devices, which may be, by way of example, a server, a router, a network PC, personal computer, workstation, a hand-held device, a peer device or other common network node. All or part of the functionality of computing devices 870 and 851 could be implemented in application specific integrated circuits, field programmable gate arrays or other special purpose hardware. In a networked environment, program modules depicted relative to the computing devices 870 and 851, or portions thereof, may be stored on one or more remote computing devices.

System memory 874 and 854 stores the program and date instructions for implementing the method described herein. The software implementation of the method described herein can be encoded via conventional programming means known to those of ordinary skill in the art, e.g., Java language implementations. The method described herein also can be implemented in commercially available numerical computing environment and programming language such as Matlab.

Platform 850 optionally is adapted and configured to mount and/or transport visual sensor(s) 820, with or without an on-board computing device 851. In another embodiment platform 850 comprises one or more substructures, with visual sensors 820 mounted on substructure and a computing device 851 mounted on another substructure. When visual sensor(s) 820 are mounted on platform 850, platform 850 should be adapted and configured to monitor, store and update positioning and orientation parameters for visual sensors 820. Exemplary platforms 850 include, for example, unmanned vehicles (e.g., airborne surveillance drones), satellites, manned vehicles (e.g., cars, tanks, aircraft, spacecraft, submarines), robots, and a video camera mounted on an endoscope.

System 80 optionally comprises a communications link 830 which uses communications media to communicating image data and control data between visual sensors 820 and computing device 851 on platform 850. Communications link 830 can include a wired or wireless connection between visual sensors 820 and computing device 851, such as, for example, a digital video connection under the IEEE 1394 protocol, to enable real-time transmission of image data from visual sensor 820. System 80 optionally includes a communications link 860 which uses communication media to exchange image data and/or control information between platform 850 and computing device 870.

Those of skill will recognize that the techniques of the embodiments described herein may be implemented to advantage in a variety of sequential orders and that the present invention may be generally implemented in magnetic media such as memory, disks, tapes and CD-ROMs or other storage media for introduction into a system for fast dense stereoscopic ranging. In such cases, instructions for executing the steps described herein for fast dense stereoscopic ranging will be embedded in the media.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated. The described embodiments illustrate the scope of the claims but do not restrict the scope of the claims.

The invention claimed is:

1. A method for initializing depth estimates in an iterative process for stereoscopic ranging, the method comprising:
    projecting a first depth estimate for each one of a plurality of valid pixels in an image, the image having an implicit camera origin;
    generating a 3D representation of the plurality of valid pixels using the first depth estimate;
    relocating the implicit camera origin;
    reprojecting the 3D representation of the plurality of valid pixels to the relocated implicit camera origin;
    using Z-buffering to render a second depth estimate for each one of the plurality of valid pixels according to the relocated implicit camera origin; and
    using the second depth estimate for each of the plurality of valid pixels as an initial value in a subsequent iteration of a process for stereoscopic ranging.

2. The method of claim 1 in which the first 3D representation is a point cloud.

3. The method of claim 1 in which the first 3D representation includes an arrays of 3-tuples representing coordinates of pixels in 3D space.

4. A non-transitory computer readable medium comprising instructions for initializing depth estimates in an iterative process for stereoscopic ranging, by:
    projecting a first depth estimate for each one of a plurality of valid pixels in an image, the image having an implicit camera origin;
    generating a 3D representation of the plurality of valid pixels using the first depth estimate;
    relocating the implicit camera origin;
    reprojecting the 3D representation of the plurality of valid pixels to the relocated implicit camera origin;
    using Z-buffering to render a second depth estimate for each one of the plurality of valid pixels according to the relocated implicit camera origin; and
    using the second depth estimate for each of the plurality of valid pixels as an initial value in a subsequent iteration of a process for stereoscopic ranging.

5. The computer readable medium of claim 4 in which the first 3D representation is a point cloud.

6. The computer readable medium of claim 4 in which the first 3D representation includes an arrays of 3-tuples representing coordinates of pixels in 3D space.

* * * * *